(No Model.)

A. OLSZEWSKI.
APPARATUS FOR PRODUCING RODS OR TUBES OF CELLULOID OR OTHER PLASTIC MATERIAL.

No. 278,667.

Patented May 29, 1883.

2 Sheets—Sheet 1.

WITNESSES:
John Everding
Herman Gustow

INVENTOR
Alexander Olszewski
By Chas. C. Gill
ATTORNEY (No Model.)  2 Sheets—Sheet 2.

A. OLSZEWSKI.
APPARATUS FOR PRODUCING RODS OR TUBES OF CELLULOID OR OTHER PLASTIC MATERIAL.

No. 278,667.  Patented May 29, 1883.

Witnesses:
Herman Gustav
Harry M. Rogers

Inventor;
Alexander Olszewski
By his Attorney,
Chas. Gill

UNITED STATES PATENT OFFICE.

ALEXANDER OLSZEWSKI, OF NEWARK, NEW JERSEY, ASSIGNOR TO THE CELLULOID MANUFACTURING COMPANY, OF NEW YORK, N. Y.

APPARATUS FOR PRODUCING RODS OR TUBES OF CELLULOID OR OTHER PLASTIC MATERIAL.

SPECIFICATION forming part of Letters Patent No. 278,667, dated May 29, 1883.

Application filed April 11, 1883. (No model.)

*To all whom it may concern:*

Be it known that I, ALEXANDER OLSZEWSKI, a citizen of the United States, residing at Newark, in the county of Essex and State of New Jersey, have invented certain new and useful Improvements in Apparatus for Producing Rods or Tubes of Celluloid or other Plastic Material; and I do hereby declare the following to be a full, clear, and exact description of the invention, such as will enable others skilled in the art to which it appertains to make and use the same.

The invention has relation to an apparatus for forming or molding rods or tubes of celluloid or other plastic material; and it consists in a means whereby a number of such rods or tubes may be formed simultaneously from one supply-chamber, wherein the celluloid or other material is or may be compressed by a hydraulic ram or other suitable means.

The apparatus and method of producing the tubes or rods will be understood from the description hereinafter presented, reference being had to the accompanying drawings, in which—

Figure 1:
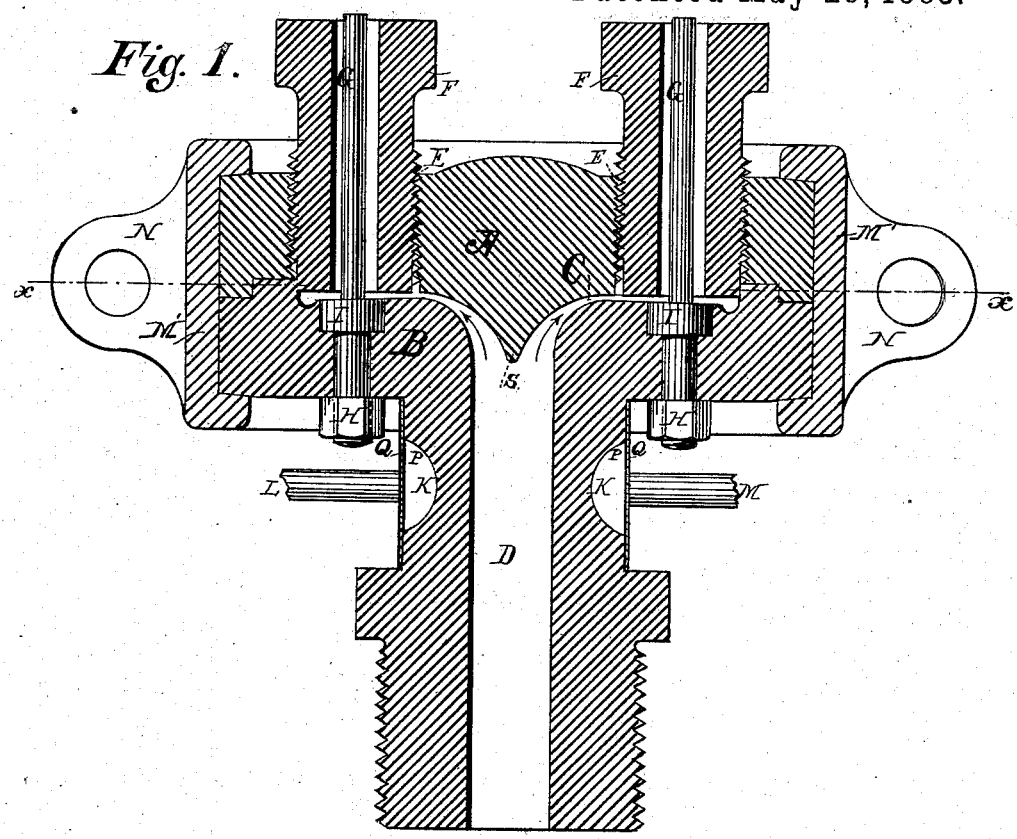
Figure 2:
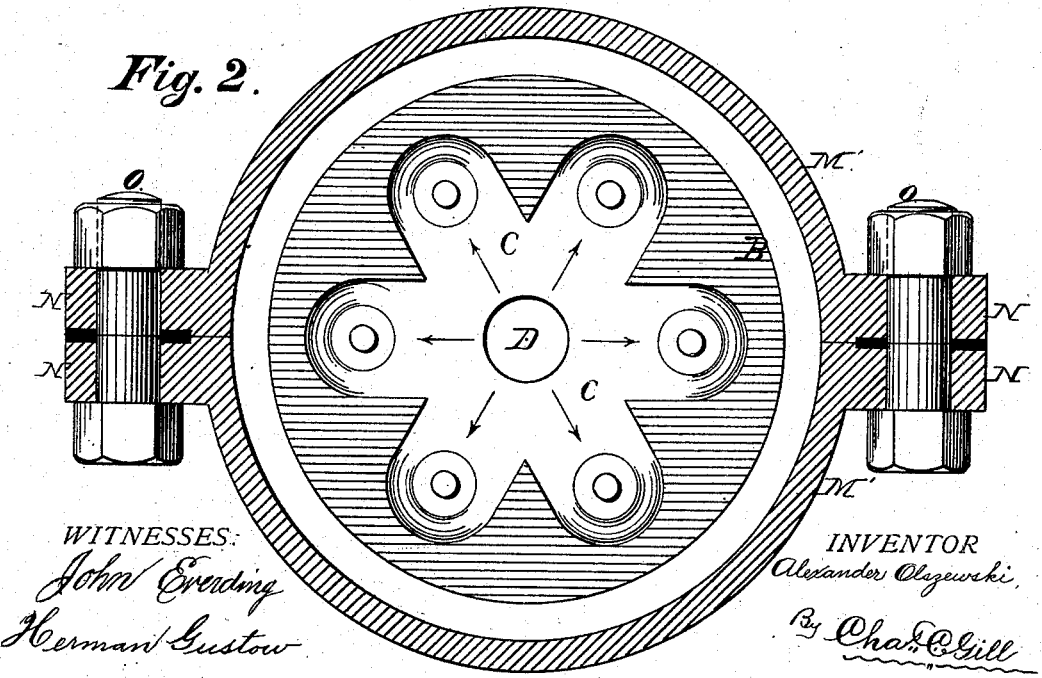
Figure 3:
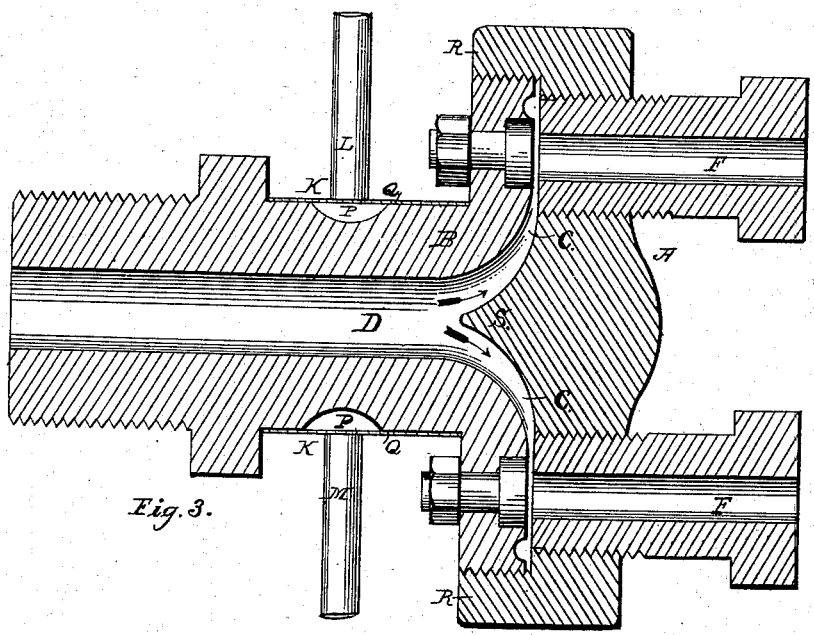

Figure 1 is a central vertical section of an embodiment of my invention. Fig. 2 represents a transverse horizontal section of same on the line $x\,x$; and Fig. 3 is a central vertical section of a modified form of the invention, showing a means of producing rods of the material of different thickness.

In the accompanying drawings, A B denote two metallic plates or disks, which are secured together at their edges, and the interior surfaces of which are so formed that when the disks are placed in face-to-face contact a chamber, C, will be formed between them, said chamber extending, preferably, to a point adjacent to the edges of the disks. The lower disk, B, is formed upon the end of or is connected with the supply-pipe D, which is adapted, by a screw-thread upon its end or otherwise, to be attached to a supply chamber or reservoir, in which the material to be treated is placed. The preferred method of construction is to have the disk B cast with the supply-pipe D, the lower end of the supply-pipe being threaded to engage a female thread in the supply-chamber. In the upper disk, A, are provided a suitable number of threaded apertures, E, in which are screwed the nozzles F, the lower end of the nozzles opening into the chamber C, and their upper ends extending a suitable distance above the disk A. Any desired number of the nozzles F may be employed, according to the will of the operator. Within the nozzle F, and arranged to extend centrally through the same, are the rods G, the lower ends of which project through the disk B, and are therein secured by the nuts H. Upon the rods G are formed the annular shoulders I, which rest in sockets in the surface of the disk B, whereby and by means of the nuts aforesaid the rods are prevented from moving in either direction. One rod will be provided for each nozzle, and will extend, preferably, a slight distance beyond the outlet of same. The chamber C, formed between the disks A B, is clearly illustrated in Fig. 2. It will be observed that the chamber consists of portions radiating from the central supply-pipe, D, to points beyond the inlet to the nozzles F. The form of chamber C, however, is not of the essence of the invention, since it is obvious that whatever form will permit the flow of the material from the supply-pipe D to the nozzles will be effective in carrying out the purpose of the invention.

Around the supply-pipe D, and preferably adjacent to the lower surface of the disk B, is formed the chamber K, having an inlet, L, and an outlet, M, the purpose of the chamber being, by means of the passage through it of steam or hot water or of cold water, to heat or cool the supply-pipe and the material passing through it when desired or found necessary. If the celluloid or other material passing through the supply-pipe D is stiff or hard, the introduction of steam into the chamber K will soften and cause it to flow more freely. When the flow of the material is too rapid the introduction of a cooling agent into the chamber K will serve to stiffen and retard the passage of the same. The disks A B are secured together, in the present instance, at their edges by the collars M', having at opposite sides the ears N, which are connected by the bolts O, as indicated in Fig. 2. The chamber K is, in the present instance, formed by covering the annular groove P with the metallic band Q, but may be constructed in any other way which may seem convenient or desirable.

The apparatus illustrated in Figs. 1 and 2 is especially adapted to the production of tubes of plastic material, and its operation is as follows: The supply-pipe D having been connected with the supply chamber or reservoir, the material is forced into the said pipe by means of a hydraulic ram or otherwise, according to well-known methods, the effect being that the material will flow into and fill every part of the chamber C. Thence it will find its way through all of the nozzles F simultaneously, forming around the rods G and issuing in the form of tubes. The device illustrated is capable of producing six tubes at the same time; but it is obvious that the construction may be varied in many respects without departing from the spirit of the invention.

In Fig. 3 I show a means of forming a number of rods instead of tubes, and in this apparatus I employ the disks A B, with the supply pipe D and nozzles F, as in the apparatus illustrated in Fig. 1, the same not having been changed in any essential respect. In this device, however, the disks A B are secured together by the thread formed upon the outer edge of the disk B, and by the thread formed upon the inner surface of the depending flange R of the disk A meshing therewith. When the disks A B are secured together the chamber C will be formed between them, as before, and will lead to the nozzles F.

It will appear obvious that the size and capacity of the chamber C may be increased or diminished by the relation the disk A bears to the disk B. For instance, if the disk A is screwed close to the upper surface of the disk B, the capacity of the chamber C will be diminished, and if the disk A is not moved so closely upon the upper surface of the disk B the chamber C will be enlarged, and consequently its containing capacity will be increased. By removing the rods G from the apparatus illustrated in Fig. 1, it will appear plain that in the operation of the device solid rods of the material being manipulated, instead of tubes, will issue from the nozzles F.

It will appear plain, also, that the disks A B may be secured together by any suitable means in addition to those illustrated in the drawings. For instance, bolts may be passed through the disks A B beyond the line of or between the nozzles F, and the disks by that means secured together. The chamber K also may be constructed in various ways, the one illustrated being only one convenient method of forming it. Upon the inner surface of the disk A is formed the inverted-cone-shaped projection S, which, when the disks are in position, projects into the upper end of the supply-pipe D and insures the free flow of the material equally into all parts of the chamber C.

The apparatus illustrated in Fig. 1 may be used for forming rods by simply removing the rods or cores G and closing the holes left by them. The insertion of the cores G into the nozzles shown in Fig. 3 would adapt the apparatus therein illustrated for forming tubes instead of rods. The nozzles and the cores or rods may be varied in their contour as may be desired, and in their construction it will be found desirable to make them of such size that they may be readily interchangeable at will. In the operation of the invention the cores G may be extended any suitable length beyond the outlet of the nozzles F, and may be coated with a veneer of the celluloid or other plastic material being manipulated, according to well-known methods of coating springs and other articles.

I desire it understood that the invention herein described is not limited in its application to celluloid merely, but includes all kinds of compressible material. The invention may be used in the manufacture of lead pipes and other articles which need not be specifically mentioned.

What I claim as my invention, and desire to secure by Letters Patent, is—

1. An apparatus consisting of a supply and a series of outlets, and adapted to the simultaneous formation of two or more tubes or rods of celluloid or other plastic material, substantially as set forth.

2. An apparatus for simultaneously forming two or more tubes or rods of celluloid or other plastic material, which consists of a supply leading to a distributing-chamber, to which is connected a series of tube or rod forming nozzles or outlets, substantially as and for the purpose as set forth.

3. An apparatus for simultaneously forming two or more rods or tubes of celluloid or other plastic material, consisting of a supply and distributing-chamber and a series of nozzles leading therefrom, substantially as set forth.

4. An apparatus for simultaneously forming two or more tubes or rods of celluloid or other plastic material, which consists of a supply and a distributing-chamber which is adjustable as to its capacity, and into which is led tube or rod forming nozzles, substantially as set forth.

5. An apparatus for the simultaneous production of two or more tubes or rods of celluloid or other plastic material, which consists of the supply, a distributing-chamber, the rod or tube forming nozzles, and the heating or cooling chamber applied to the supply, substantially as set forth.

6. An apparatus for simultaneously forming two or more rods or tubes of celluloid or other plastic material, which consists of the disks A B, supply D, the distributing-chamber between the disks, and the nozzles F, screwed into the disk A, substantially as set forth.

7. The apparatus herein described, consisting of the disks A B, chamber C, supply D, and nozzles F, containing rods or cores G, substantially as set forth.

8. The apparatus herein described, consisting of the disks A B, chamber C, supply D, tube or rod forming nozzles connected with the said chamber, the disk A, having the invertedcone-shaped projection extending into the supply D, substantially as set forth.

9. The apparatus herein described, consisting of the disks A B, having a distributing-chamber between them, the supply D, rod or tube forming nozzles connecting with the said distributing-chamber, the disks being secured together by the collars M, substantially as set forth.

10. The apparatus herein described for the formation of two or more rods or tubes of celluloid or analogous plastic material, which consists of a supply, a distributing-chamber adjustable as to its capacity, and a series of tube or rod forming nozzles connected therewith, substantially as set forth.

In testimony whereof I affix my signature in presence of two witnesses.

ALEXANDER OLSZEWSKI.

Witnesses:
CHAS. C. GILL,
HERMAN GUSTOW.